(12) United States Patent
Kakeya et al.

(10) Patent No.: US 9,972,875 B2
(45) Date of Patent: May 15, 2018

(54) ALKALINE STORAGE BATTERY

(71) Applicants: GS Yuasa International Ltd., Kyoto-shi, Kyoto (JP); KYOTO UNIVERSITY, Kyoto-shi, Kyoto (JP)

(72) Inventors: Tadashi Kakeya, Kyoto (JP); Akiyoshi Nakata, Kyoto (JP); Toshiro Hirai, Kyoto (JP); Hajime Arai, Kyoto (JP); Junichi Yamaki, Kyoto (JP); Zempachi Ogumi, Kyoto (JP)

(73) Assignees: GS Yuasa International Ltd., Kyoto (JP); KYORO UNIVERSITY, Kyoto (JP)

( * ) Notice: Subject to any disclaimer, the term of this patent is extended or adjusted under 35 U.S.C. 154(b) by 114 days.

(21) Appl. No.: 14/955,703

(22) Filed: Dec. 1, 2015

(65) Prior Publication Data

US 2016/0164151 A1    Jun. 9, 2016

(30) Foreign Application Priority Data

Dec. 4, 2014 (JP) .............................. 2014-245631
Jul. 13, 2015 (JP) .............................. 2015-139510

(51) Int. Cl.
| | | |
|---|---|---|
| *H01M 12/08* | (2006.01) | |
| *H01M 4/24* | (2006.01) | |
| *H01M 4/38* | (2006.01) | |

(52) U.S. Cl.
CPC ........... *H01M 12/08* (2013.01); *H01M 4/244* (2013.01); *H01M 4/38* (2013.01); *H01M 2300/0014* (2013.01); *Y02E 60/128* (2013.01)

(58) Field of Classification Search
CPC ......... H01M 12/08; H01M 2300/0014; H01M 4/38; H01M 4/244; Y02E 60/128

USPC .......................................................... 429/403
See application file for complete search history.

(56) References Cited

U.S. PATENT DOCUMENTS

| | | | | |
|---|---|---|---|---|
| 3,540,935 A | * | 11/1970 | Keating | H01M 10/26 429/222 |
| 2009/0305139 A1 | * | 12/2009 | Oh | H01M 4/133 429/231.8 |
| 2011/0236799 A1 | * | 9/2011 | Burchardt | H01M 2/1653 429/534 |

FOREIGN PATENT DOCUMENTS

| | | |
|---|---|---|
| JP | 58184274 A2 | 10/1983 |
| JP | 2087465 A2 | 3/1990 |
| JP | 5151975 A2 | 6/1993 |
| JP | 6275310 A2 | 9/1994 |
| JP | 2006040701 A2 | 2/2006 |
| JP | 2006286485 A2 | 10/2006 |
| JP | 2008021497 A2 | 1/2008 |
| JP | 2008305742 A2 | 12/2008 |

(Continued)

OTHER PUBLICATIONS

The Density of Aqueous Solutions of Sodium Hydroxide by Gosta Akerlof and Gerson Kegeles in the Journal of the American Chemical Society, vol. 61, 1939, p. 1027-1032.*

*Primary Examiner* — Jonathan Jelsma
*Assistant Examiner* — Omar Kekia
(74) *Attorney, Agent, or Firm* — Rankin, Hill & Clark, LLP (57) ABSTRACT

An alkaline storage battery includes a positive electrode, a negative electrode containing, as an active material, at least one of a metal capable of forming dendrites and a metal compound thereof, and an alkaline electrolyte solution, wherein a compound having a primary amino group and having no carboxyl group is contained in the alkaline electrolyte solution in an amount greater than or equal to 7% by volume.

10 Claims, 3 Drawing Sheets

(56) References Cited

FOREIGN PATENT DOCUMENTS

| | | | |
|---|---|---|---|
| JP | 2011165382 | A2 | 8/2011 |
| JP | 2013084349 | A1 | 5/2013 |

* cited by examiner

ALKALINE STORAGE BATTERY

CROSS-REFERENCE TO RELATED APPLICATIONS

This application claims the benefit of Japanese patent applications No. 2014-245631 filed on Dec. 4, 2014, and No. 2015-139510 filed on Jul. 13, 2015, which are incorporated by reference.

FIELD

The present invention relates to an alkaline storage battery.

BACKGROUND

In recent years, electronic equipment has been becoming increasingly smaller in size and lighter in weight, and there has been a steady increase in demand for a highly enhanced energy density battery as a power source. Zn, Mg, Cd, Al, Ca, Fe or the like as a negative active material for such a battery has high energy density and power density per unit mass, and moreover, there are advantages that those are inexpensive and excellent in safety.

However, in a negative electrode containing Zn (zinc) or the like as an active material, dendrites of zinc or the like may grow at the time of charging since the solubility of zinc is high and then the dendrites may penetrate through a separator. This may result in a short circuit, and this may cause the charge-discharge cycle life to be shortened (see, for example, JP 6-275310 A).

In JP 6-275310 A, there has been proposed "a sealed alkaline zinc storage battery in which an electrode groups prepared by layering a zinc negative electrode composed mainly of zinc oxide and metallic zinc, a positive electrode, and a liquid holding layer and a separator which are interposed between the zinc negative electrode and the positive electrode, wherein the liquid holding layer and the separator are impregnated with an electrolyte solution, and wherein polyethyleneimine having a molecular weight less than or equal to 10000 is added into the electrode group." (See claim 1.) Also it has been shown that "since crystals of metallic zinc attempting to grow into dendrites are surrounded by a polyethyleneimine having a molecular eight less than or equal to 10000, the growth of the crystals can be suppressed." (See paragraph [0008].)

Moreover, it has been described that "As a polyethyleneimine to be added into the electrode group of the above-mentioned sealed nickel-zinc storage battery, a polyethyleneimine with a structure in which a primary amino nitrogen atom, a secondary amino nitrogen atom or a tertiary amino nitrogen atom is contained is preferred." (See paragraph [0010].) Also it has been described that "even when any polyethyleneimine having a certain molecular weight listed in Table 2 is added to the electrolyte solution, sufficient effects are not attained in the point of enhancing the number of cycles because the solubility is small, but by adding the polyethyleneimine to the zinc negative electrode or the liquid holding layer, the number of cycles can be greatly enhanced." (See paragraph [0019].)

In JP 2006-286485 A, there has been described "an alkaline battery allowing a negative electrode gel including zinc or a zinc alloy as a negative active material to face a positive active material with a separator interposed between the negative electrode gel and the positive active material, wherein a chelating reagent is added to the negative electrode gel." (See claim 1.) Also it has been described that "an object thereof is to provide an alkaline battery capable of making the thickness of a separator thin to increase the amount of power generating material, effectively suppressing crystals of zinc oxide from being generated/growing due to discharging and then from penetrating through the separator, and thereby, comprehensively enhancing the discharge performance." (See paragraph [0008].) Moreover, it has been shown that ethanolamine, oxalic acid, ethylenediamine, ethylenediaminetetraacetic acid, glycine, iminodiacetic acid, nitrilotriacetic acid or cyclohexanediaminetetraacetic acid as a chelating reagent was added to the negative electrode gel. (See Table 1, paragraphs [0033] to [0044].)

Furthermore, there have been pointed out the generation of hydrogen gas caused by a side reaction, the dendrite generated at the time of precipitation of zinc and the shape change as causes for a shortened life of the charge-discharge cycle in a zinc/air battery prepared with an aqueous electrolyte solution (see, JP 2013-84349 A). In JP 2013-84349 A, there has been described "a electrolyte solution for an alkaline battery including at least an organic substance having two or more carbon atoms and having one or more hydroxyl groups in its molecule." (See claim 1.) It has been described that "an object of the present invention is to provide an electrolyte solution for an alkaline battery and an alkaline battery capable of suppressing the generation of hydrogen gas caused by a side reaction, the dendrite generated at the time of precipitation of zinc and the shape change of zinc to attain a prolonged charge-discharge cycle and excellent charge-discharge efficiency." (See paragraph [0007].) Also it has been described that "by allowing the electrolyte solution to have such a configuration, when applied to an alkaline secondary battery such as an air-zinc secondary battery and a nickel-zinc secondary battery, it is possible to suppress the generation of hydrogen gas caused by a side reaction, the dendrite generated at the time of precipitation of zinc and the shape change of zinc. As a result, it is possible to attain a prolonged charge-discharge cycle and excellent charge-discharge efficiency." (See paragraph [0024].)

In JP 58-184274 A, there has been described "a secondary battery including cadmium or zinc as a cathode active material, wherein an additive reagent which reacts with cadmium or zinc to form a complex ion or a chelate ion is added." (See claim 1.) Also it has been described that " . . . in a sealed secondary battery including cadmium or zinc as a cathode active material, an object thereof is to provide a secondary battery capable of surely preventing an increase in battery inner pressure and becoming a completely sealed rechargeable battery" (See page 2, upper right column, 7th to 11th lines.) Moreover, there has been shown ethylenediamine as an additive reagent which forms a complex ion or a chelate ion. (See same page, lower left column, 3rd to 6th lines.) It has been described that "in the case where the additive reagent is added to an electrolyte solution, the addition amount thereof is preferably 0.05 to 2 wt % or so." (See same page, lower right column, 7th to 9th lines.) In examples, it has been shown that hexamethylenediamine in an amount of 0.1% is added to the electrolyte solution. (See page 3, upper left column, 4th to 2nd lines from the bottom.)

As described in JP 6-275310 A, JP 2006-286485 A, and JP 2013-84349 A mentioned above, in an electrode where zinc or the like is used as an active material, the dendrite formation and the shape change (a phenomenon in which the active material is gathered in the vicinity of the center of the electrode plane) occur during charging/discharging, and it is considered that this is a factor of deteriorating discharge performance and cycle characteristics, but even when an organic substance having an imino group, a carboxyl group, a hydroxyl group or the like, and the like are added to the electrolyte solution, the cycle characteristics have not been sufficiently improved.

In JP 2006-286485 A, it has been described that ethanolamine, ethylenediamine or the like is added, but this invention discloses that the above-mentioned amine is added to the negative electrode gel and is not aimed at enhancing the cycle characteristics.

In JP 58-184274 A, it has been described that ethylenediamine, hexamethylenediamine or the like is added to the electrolyte solution, but the addition amount is small and a technique for enhancing the cycle characteristics of a battery prepared a negative electrode containing cadmium or zinc as an active material has not been shown.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to enhance the cycle characteristics of an alkaline storage battery by adding a specific compound as an additive reagent to an electrolyte solution of the alkaline storage battery including at least one of a metal capable of forming dendrites such as zinc and a compound thereof as a negative active material.

An aspect of the present invention provides an alkaline storage battery including a positive electrode, a negative electrode containing, as an active material, at least one of a metal capable of forming dendrites and a metal compound thereof, and an alkaline electrolyte solution, wherein a compound having a primary amino group and having no carboxyl group is contained in the alkaline electrolyte solution in an amount greater than or equal to 7% by volume relative to the whole volume of the alkaline electrolyte solution.

BRIEF DESCRIPTION OF DRAWINGS

The foregoing and other features of the present invention will become apparent from the following description and drawings of an illustrative embodiment of the invention in which.

DESCRIPTION OF EMBODIMENTS

A first aspect of the present invention provides an alkaline storage battery including a positive electrode, a negative electrode containing, as an active material, at least one of a metal capable of forming dendrites and a metal compound thereof (a metal compound of the metal capable of forming dendrites), and an alkaline electrolyte solution, wherein a compound having a primary amino group and having no carboxyl group is contained in the alkaline electrolyte solution in an amount greater than or equal to 7% by volume relative to the whole volume of the alkaline electrolyte solution.

According to a second aspect of the present invention, the compound may be contained in an amount of 13 to 30% by volume relative to the whole volume of the alkaline electrolyte solution.

According to a third aspect of the present invention, the alkaline storage battery may be an open type battery.

According to a fourth aspect of the present invention, an amino group which the compound has may be composed only of the primary amino group.

According to a fifth aspect of the present invention, the compound may have two or more primary amino groups.

According to a sixth aspect of the present invention, the compound may include at least one selected from the group consisting of ethylenediamine, propanediamine and butanediamine.

According to a seventh aspect of the present invention, the compound may have a molecular weight less than or equal to 200.

According to an eighth aspect of the present invention, the compound may have a molecular weight less than or equal to 90.

According to a ninth aspect of the present invention, the compound may be contained at a concentration greater than or equal to 2% by mole in the alkaline electrolyte solution.

According to a tenth aspect of the present invention, the alkaline electrolyte solution may contain sodium hydroxide.

According to an eleventh aspect of the present invention, the metal capable of forming dendrites which is the active material of the negative electrode may be at least one selected from the group consisting of Zn, Mg, Cd, Al, Ca and Fe.

According to a twelfth aspect of the present invention, the metal capable of forming dendrites may be Zn.

According to a thirteenth aspect of the present invention, the positive electrode may be an air electrode.

In the present invention (the first to thirteenth aspects of the present invention), by adding a specific compound as an additive reagent to the electrolyte solution, it is possible to enhance the cycle characteristics of an alkaline storage battery including at least one of a metal capable of forming dendrites such as zinc and a compound thereof as a negative active material. Moreover, it has become apparent that the effect is not exerted in the case where the addition amount thereof is not greater than or equal to a prescribed amount (greater than or equal to 7% by volume).

In the alkaline electrolyte solution of the present invention, at least one of a metal capable of forming dendrites and a metal compound thereof can be applied as an active material of the negative electrode. In this context, "at least one of a metal capable of forming dendrites and a metal compound thereof" means at least one of a metal and a metal compound which is at least one of a base metal such as Zn, Mg, Cd, Al, Ca or Fe, an alloy thereof, a compound of the base metal and the alloy, or the like and has a possibility of forming dendrites at the time of dissolution to or precipitation from the alkaline electrolyte solution.

By using the alkaline electrolyte solution of the present invention, it is possible to suppress the formation of dendrites caused by the above-mentioned metal and metal compound thereof as negative active materials at the time of dissolution or precipitation, and the cycle characteristics of an alkaline storage battery are enhanced. Of these, the negative active material is preferable in the case where Zn, Cd or Fe is used, and in particular, the negative active material is more preferable in the case where Zn (zinc) is used.

In the present invention, by adding a compound having a primary amino group to the alkaline electrolyte solution for an alkaline storage battery provided with a negative electrode containing a metal capable of forming dendrites such as zinc and/or a metal compound thereof as an active material, it is possible to control the form of the electrode at the time of dissolution or precipitation of zinc or the like, the formation of dendrites is suppressed and the cycle life is enhanced. As the compound having a primary amino group, ethylenediamine, 1,2-propanediamine (propylenediamine), 1,3-propanediamine (trimethylenediamine), 1,4-butanediamine (tetramethylenediamine), triethylenetetramine, tetraethylenepentamine, aminoethanol and the like may be used. A compound in which the amino group is composed only of the primary amino group and a compound having two or more primary amino groups such as ethylenediamine, 1,2-propanediamine, 1,3-propanediamine and 1,4-butanediamine are preferred. Ethylenediamine (EDA) is especially preferred. A compound having a molecular weight less than or equal to 200 is preferred because there is little influence by which the ion diffusibility and the electron conductivity are lowered. Furthermore, a compound having a molecular weight less than or equal to 90 is preferred in the point that the content in the electrolyte solution can be increased.

A compound being the compound having a primary amino group but having a carboxyl group such as glycine does not create the effect since a neutralization reaction occurs between the compound and an alkali in the electrolyte solution. Thus, a compound having a primary amino group and having no carboxyl group is preferred. The carboxyl group contained as an impurity at a certain degree of having no influence on the effect of the present invention is not excluded.

A compound in which an $NH_2$ group exists at the end is preferred, and when an N atom exists in the middle of the molecular chain, the compound is not preferred because the alkali resistance is lowered. It is necessary to allow the compound to have a primary amino group, and an imino group, a hydroxyl group and the like are ineffective.

The content of the compound (additive reagent) having a primary amino group and having no carboxyl group in the alkaline electrolyte solution is greater than or equal to 7% by volume relative to 100% by volume of the whole volume of the alkaline electrolyte solution. When the content is less than 7% by volume, the addition effect is not exerted, and the cycle life is not enhanced. It is preferred that the content be greater than or equal to 10% by volume. It is more preferred that the content be greater than or equal to 13% by volume. Furthermore, it is preferred that the content be greater than or equal to 20% by volume. Since phase separation is observed in the electrolyte solution when the content of the additive reagent is greater than 30% by volume, it is preferred that the content be less than or equal to 30% by volume. In terms of the molar amount, it is preferred that the content of the additive reagent be 1% by mole to 4.5% by mole and it is more preferred that the content thereof be 2% by mole to 4% by mole, in the alkaline electrolyte solution. Furthermore, it is preferred that the content thereof be greater than or equal to 3% by mole.

Moreover, it is preferred that the content of the additive reagent relative to the amount of zinc be greater than or equal to 2.1% by mole, and it is more preferred that the content thereof be 3% by mole to 9% by mole.

Moreover, even in the case of a compound having a primary amino group and having no carboxyl group, when the compound has a large molecular weight, it becomes difficult to allow the compound in an amount greater than or equal to 7% by volume to be dissolved in the alkaline electrolyte solution. For example, with regard to pentaethylenehexamine having a primary amino group and a secondary amino group which has a structure similar to that of polyethyleneimine, a test was performed, whereupon pentaethylenehexamine in an amount of 6.1% by volume failed to be dissolved in the electrolyte solution. Since the molecular weight of pentaethylenehexamine is 232 and the molecular weight of tetraethylenepentamine in Example 1-13 described later is 189, it can be said that a value of the molecular weight allowing the compound in an amount greater than or equal to 7% by volume to be dissolved in the electrolyte solution lies between 232 and 189. Accordingly, it is considered that in the case where the molecular weight of a polyethyleneimine having a structure similar to those of these compounds is greater than or equal to 250 as described in JP 6-275310 A, the polyethyleneimine in an amount greater than or equal to 7% by volume fails to be dissolved in the electrolyte solution. In the present invention, by allowing the molecular weight of a compound having a primary amino group and having no carboxyl group to be less than or equal to 200, it is possible to allow the content of the compound to be greater than or equal to 7% by volume in the alkaline electrolyte solution.

As the alkaline electrolyte solution in the present invention, for example, a solution prepared by dissolving a hydroxide of an alkali metal in water can be used. Examples of the hydroxide of an alkali metal include KOH, NaOH, LiOH and the like. One kind thereof can be used alone or two or more kinds thereof can be used in combination. It is preferred that NaOH be contained in the alkaline electrolyte solution. Hydrogen is generated from the zinc electrode and the self discharge is promoted when the alkali concentration is low. The viscosity of the electrolyte solution is increased and the ion diffusibility is lowered when the alkali concentration is high. Therefore, it is preferred that the alkali concentration lie within the range of 3% by mole to 9% by mole.

As mentioned above, it is preferred that metallic zinc and/or a zinc compound be used as the negative active material. It is more preferred that one or both of zinc oxide (ZnO) and metallic zinc (Zn) be used as the negative active material.

For example, a mixture of powder of the negative active material and acetylene black, powder of PbO and the like is added with water and a binder such as polytetrafluoroethylene and styrene-butadiene rubber to prepare a paste. A substrate such as copper foam and nickel foam is filled with this paste or a perforated steel sheet is applied with this paste and sufficiently dried, after which the substrate or the steel sheet is subjected to roll processing and cut into pieces to prepare a negative electrode.

The alkaline electrolyte solution can be used irrespective of the kind of the positive electrode as long as the alkaline storage battery is provided with a negative electrode containing a metal capable of forming dendrites such as zinc and/or a metal compound thereof as an active material. The alkaline electrolyte solution can be applied to an alkaline zinc storage battery such as a nickel-zinc storage battery, a silver oxide-zinc storage battery, a manganese-zinc storage battery and an air-zinc storage battery, a nickel-cadmium storage battery, an air-magnesium storage battery, an air-aluminum storage battery, an air-calcium storage battery, an air-iron storage battery, and the like. Of these, an air-zinc storage battery is preferred. The decomposition of the compound of the present invention can be suppressed by virtue of the potential of an air electrode.

For example, as the positive electrode, a nickel electrode constituted of a metal hydroxide composed mainly of nickel oxyhydroxide and a current collector such as nickel foam, an air electrode constituted of a carbon material, an oxygen reduction catalyst and a binding agent, or the like can be used.

In the alkaline storage battery according to the present invention, as a separator, a sheet of cellophane used for a conventional alkaline zinc storage battery, a polyvinyl alcohol membrane having a crosslinked structure, a polyolefin membrane, and the like can be used. In particular, a separator with a composite structure in which a nonwoven fabric separator made of polyethylene (PE), polypropylene (PP) or the like is arranged superposedly on a microporous membrane separator made of PE, PP or the like is preferred in view of preventing a short circuit caused by dendrites.

Figure 1A:
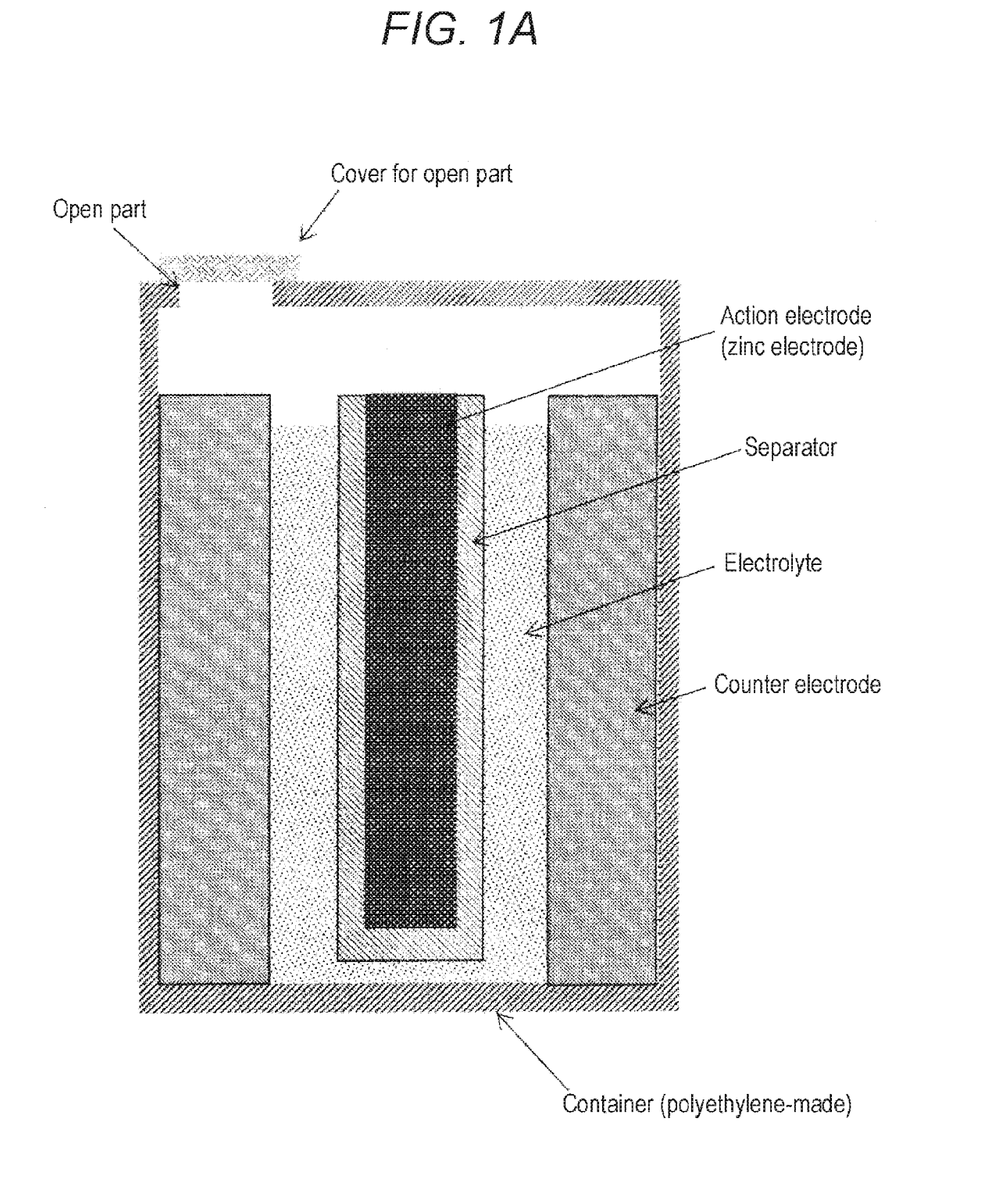
FIG. 1A is a schematic view of an open type alkaline storage battery according to an aspect of the present invention.

As shown in FIG. 1A, it is preferred that the alkaline storage battery be an open type battery.

The open type battery needs only to allow the inner pressure of the battery and the outside pressure to almost correspond to each other.

As shown in FIG. 1A, at the open part of the open type battery, a cover for preventing contamination by foreign substances from the outside, or the like can be provided. Examples of the form of the cover include an automatic return type valve body for releasing the inner pressure of the battery to the outside of the battery, and the like.

Figure 1B:
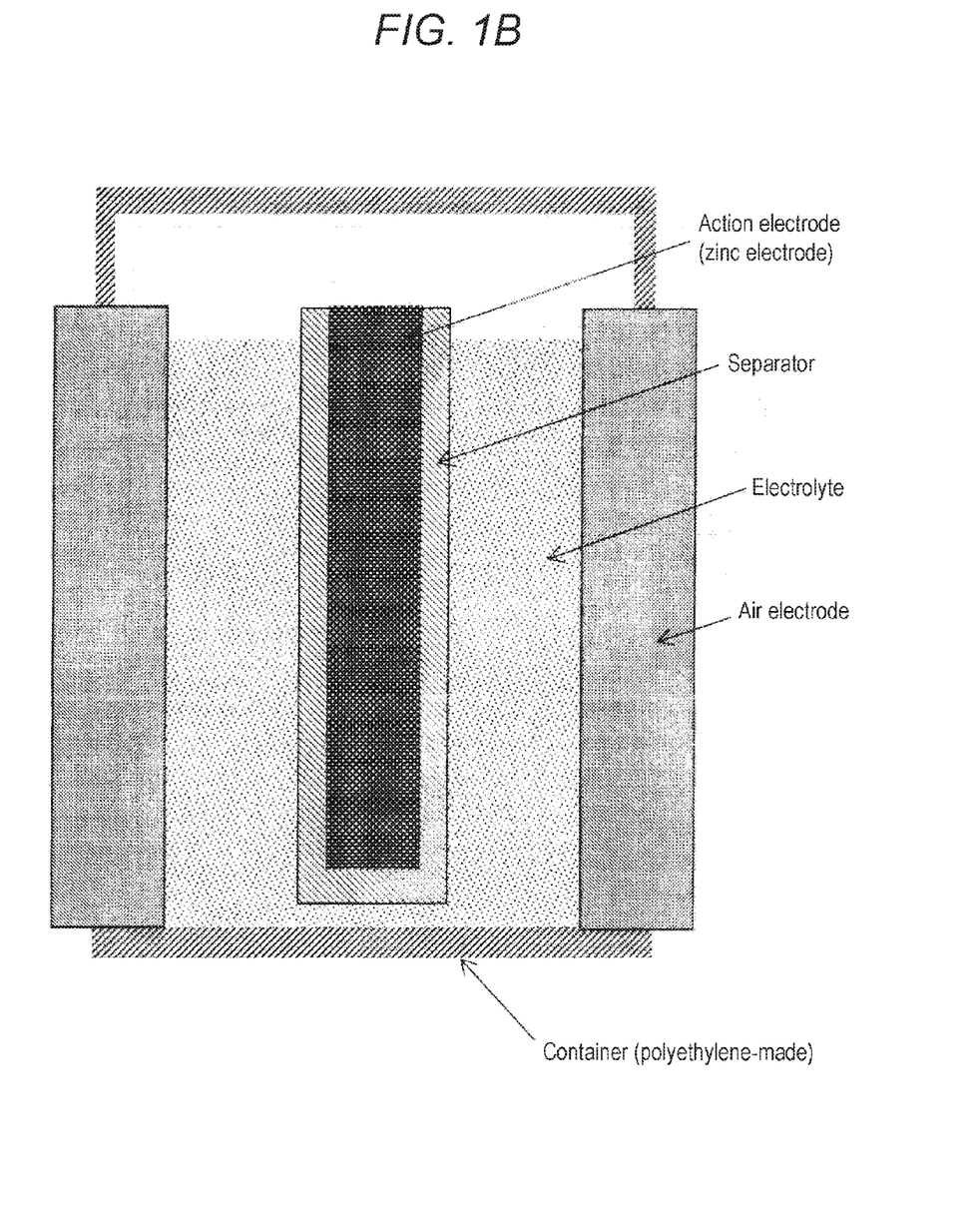
FIG. 1B is a schematic view of an open type alkaline storage battery according to another aspect of the present invention (using an air electrode as a counter electrode).

Moreover, as shown in FIG. 1B, in the case where an air electrode is used for the electrode, the inner pressure of the battery can be released through the air electrode to the outside of the battery. The battery having an air electrode is preferred because it is not necessary to newly provide an inner pressure-releasing mechanism, and the battery structure can be simplified.

For example, even when a large amount of ethylenediamine is added to the alkaline electrolyte solution, in the case where the battery is an open type battery, there is no fear of troubles due to the gas generation as compared with sealed storage batteries described in JP 6-275310 A, JP 2006-286485 A, JP 2013-84349 A and JP 58-184274 A. And then, by adding ethylenediamine or the like in an amount greater than or equal to a prescribed amount, it is possible to enhance the cycle characteristics and to enhance the high rate discharge characteristics.

EXAMPLES

Example 1

Example 1-1

<Preparation of Alkaline Electrolyte Solution>

KOH powder was dissolved in pure water to prepare an aqueous alkali solution. Ethylenediamine (EDA) as added to the aqueous alkali solution, and the concentration was adjusted so that ethylenediamine is contained at a concentration of 13.4% by volume (2% by mole) relative to the whole volume of 100% by volume of the aqueous 4% by mole KOH alkali solution. Furthermore, the aqueous alkali solution was added with an excessive amount of ZnO powder and stirred for 24 hours at 25° C. Afterward, by allowing the aqueous alkali solution to be filtered to remove excess ZnO, a zinc-saturated alkaline electrolyte solution was obtained and an alkaline electrolyte solution used in Example 1-1 was prepared.

<Preparation of Zinc Negative Electrode>

Prescribed amounts of ZnO powder, acetylene black (AB) and PbO powder were weighed and stirred. Afterward, water and a polytetrafluoroethylene (PTFE) dispersion were added to the mixture, and furthermore, the contents were stirred to prepare a paste. The respective solid content ratios were adjusted so as to satisfy the equation of ZnO:AB:PTFE:PbO=88:5:5: (mass %), and the moisture content was adjusted to be 65 mass % in the whole paste. A copper foam substrate with a thickness of 1 mm and a density per area of 0.45 g/cm$^2$ was filled with the paste and sufficiently dried, after which the substrate was subjected to roll processing. With this setup, a sheet of the ZnO electrode with a thickness of 0.35 mm was obtained. This substrate is cut into a size of 2 cm by 2 cm to obtain a ZnO electrode (zinc negative electrode). The paste filling amount was adjusted so that the theoretical capacity of this zinc negative electrode (plate) becomes 100 mAh.

<Preparation of Counter Electrode>

For the purpose of reducing an influence on the zinc negative electrode by a counter electrode, a ZnO electrode was also used for the counter electrode. Zn powder was added to the raw material of the above-mentioned zinc negative electrode, and the paste blending ratio was adjusted so as to satisfy the equation of Zn:ZnO:AB:PTFE=54:345:5:2 (mass %). Moreover, a counter electrode was prepared in the same manner as that for the zinc negative electrode except that the plate area was set to 2.5 cm by 3.0 cm and a substrate was filled with a paste so as to allow the electrode capacitance thereof to exceed that of the zinc negative electrode.

<Preparation of Cell>

At both sides, which are allowed to face the counter electrode respectively, of the zinc negative electrode prepared as above, a polypropylene-made microporous membrane separator was arranged, and furthermore, a nonwoven fabric separator constituted of polypropylene and fiber prepared with polypropylene was arranged superposedly thereon. Counter electrodes were arranged at both sides of the zinc negative electrode to be set in a container. Moreover, an Hg/HgO electrode was provided as a reference electrode. The alkaline electrolyte solution prepared as above was poured (2.5 ml) so much that electrodes were sufficiently immersed therein. Afterward, the contents were allowed to settle until the electrolyte solution sufficiently permeates the electrode. In this way, an open type cell in accordance with Example 1-1 was prepared.

Examples 1-2 to 1-13

Alkaline electrolyte solutions were prepared in the same manner as that in Example 1-1 except that the kind of an additive reagent added to the zinc-saturated alkaline electrolyte solution and/or the addition amount thereof were changed to those listed in Table 1 to prepare open type cells in accordance with Examples 1-2 to 1-4, 1-8 to 1-13.

Alkaline electrolyte solutions were prepared in the same manner as that in Example 1-2 except that the kind of an electrolyte salt in the alkaline electrolyte solution and/or the addition amount thereof were changed to those listed in Table 1 to prepare open type cells in accordance with Examples 1-5 to 1-7.

Comparative Examples 1-1, 1-5 to 1-7

Alkaline electrolyte solutions were prepared in the same manner as that in each of Examples 1-1, 1-5 to 1-7 except that ethylenediamine (EDA) is not added to a zinc-saturated alkaline electrolyte solution to prepare open type cells in accordance with Comparative Examples 1-1, 1-5 to 1-7.

Comparative Examples 1-2 to 1-4, 1-8 to 1-11

Alkaline electrolyte solutions were prepared in the same manner as that in Example 1-1 except that the kind of an additive reagent added to the zinc-saturated alkaline electrolyte solution and/or the addition amount thereof were changed to those listed in Table 1 to prepare open type cells in accordance with Comparative Examples 1-2 to 1-4, 1-8 to 1-11.

<Cycle Characteristics Evaluation>

With regard to alkaline storage batteries including alkaline electrolyte solutions prepared in Examples 1-1 to 1-13 and Comparative Examples 1-1 to 1-11, a cycle test was performed under the following condition and under an environment of 25° C.

At the first cycle, the charge-discharge was performed under the following condition.

The current was set to 0.25 CmA (25 mA), an alkaline storage battery was charged for 1 hour, and after an interval of 5 minutes, the battery was discharged so that the voltage becomes −0.8 V relative to a reference electrode.

At the second or later cycle, the charge-discharge was repeated under the following condition.

The current was set to 0.5 CmA (50 mA), the alkaline storage battery was charged for 1 hour, and after an interval of 5 minutes, the battery was discharged so that the voltage becomes −0.8 V relative to a reference electrode.

The cycle test was performed under the foregoing condition, and the number of cycles at which the discharge capacity begins to rapidly decrease was defined as the cycle life. Moreover, also in the case where a short circuit is caused by the dendrite formation, the number of cycles was defined as the cycle life.

Figure 2:
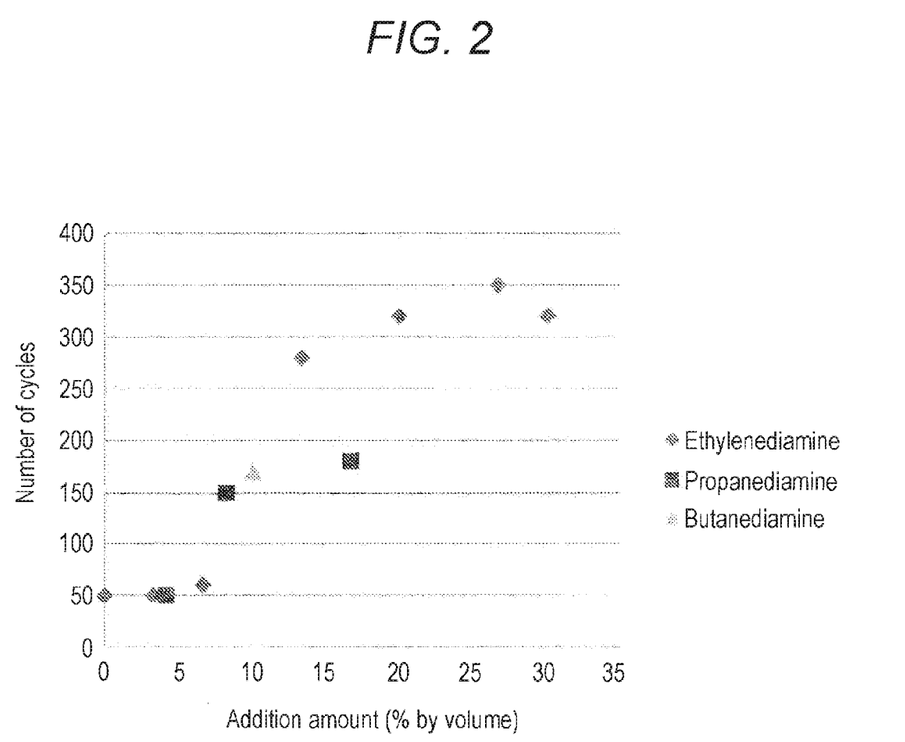
FIG. 2 is a plot showing a relation between a number of cycles (cycle life) and addition amounts of ethylenediamine, propanediamine and butanediamine in Examples and Comparative Examples.

The results of the cycle test are shown in Table 1 together with the composition of the alkaline electrolyte solution and the volume % of the additive reagent (the compound having a primary amino group and having no carboxyl group, and the like). Moreover, the relation between the cycle life and the addition amounts of ethylenediamine, propanediamine and butanediamine in Examples of the present invention and Comparative Examples is shown in FIG. 2.

TABLE 1

| | Electrolyte salt (% by mole) | | | | Addition amount | | Molecular weight of additive reagent | Number of cycles |
|---|---|---|---|---|---|---|---|---|
| | KOH | NaOH | LiOH | Kind of additive reagent | % by mole | % by volume | | |
| Example 1-1 | 4 | 0 | 0 | Ethylenediamine | 2 | 13.4 | 60.1 | 280 |
| Example 1-2 | 4 | 0 | 0 | Ethylenediamine | 3 | 20.0 | 60.1 | 320 |
| Example 1-3 | 4 | 0 | 0 | Ethylenediamine | 4 | 26.7 | 60.1 | 350 |
| Example 1-4 | 4 | 0 | 0 | Ethylenediamine | 4.5 | 30.1 | 60.1 | 320 |
| Example 1-5 | 3.5 | 0 | 0.5 | Ethylenediamine | 3 | 20.0 | 60.1 | 330 |
| Example 1-6 | 0 | 4 | 0 | Ethylenediamine | 3 | 20.0 | 60.1 | 410 |
| Example 1-7 | 0 | 3.5 | 0.5 | Ethylenediamine | 3 | 20.0 | 60.1 | 400 |
| Example 1-8 | 4 | 0 | 0 | Propanediamine | 1 | 8.3 | 74.12 | 150 |
| Example 1-9 | 4 | 0 | 0 | Propanediamine | 2 | 16.7 | 74.12 | 180 |
| Example 1-10 | 4 | 0 | 0 | Butanediamine | 1 | 10.1 | 88.15 | 170 |
| Example 1-11 | 4 | 0 | 0 | Aminoethanol | 3 | 18.1 | 61.08 | 130 |
| Example 1-12 | 4 | 0 | 0 | Triethylenetetramine | 0.5 | 7.4 | 146.2 | 90 |
| Example 1-13 | 4 | 0 | 0 | Tetraethylenepentamine | 0.5 | 9.5 | 189.3 | 110 |
| Comparative Example 1-1 | 4 | 0 | 0 | Not added | Not added | Not added | | 50 |
| Comparative Example 1-2 | 4 | 0 | 0 | Ethylenediamine | 0.5 | 3.3 | 60.1 | 50 |
| Comparative Example 1-3 | 4 | 0 | 0 | Ethylenediamine | 1 | 6.7 | 60.1 | 60 |
| Comparative Example 1-4 | 4 | 0 | 0 | Propanediamine | 0.5 | 4.2 | 74.12 | 50 |
| Comparative Example 1-5 | 3.5 | 0 | 0.5 | Not added | Not added | Not added | | 60 |
| Comparative Example 1-6 | 0 | 4 | 0 | Not added | Not added | Not added | | 80 |
| Comparative Example 1-7 | 0 | 3.5 | 0.5 | Not added | Not added | Not added | | 75 |
| Comparative Example 1-8 | 4 | 0 | 0 | Citric acid | 1 | 11.5 | 192.1 | 0 |
| Comparative Example 1-9 | 4 | 0 | 0 | Glycine | 3 | 19.4 | 75.1 | 50 |
| Comparative Example 1-10 | 4 | 0 | 0 | Iminodiethanol | 3 | 28.9 | 105.14 | 50 |
| Comparative Example 1-11 | 4 | 0 | 0 | Ethylenediaminetetraacetic acid | 0.5 | 17.0 | 292.24 | 50 |

From Table 1, it has been found that the alkaline storage batteries including alkaline electrolyte solutions which are prepared in Examples 1-1 to 1-13 and allow a compound having a primary amino group and having no carboxyl group in an amount of 7 to 30% by volume to be contained therein are enhanced in cycle life as compared with those in the cases where an additive reagent is not contained (Comparative Example 1-1, Comparative Examples 1-5 to 1-7).

In Examples 1-1 to 1-13, since a complex is formed in the electrolyte solution when zinc is precipitated at the time of charging, it is possible to suppress the local precipitation of zinc (the dendrite formation, and the like). Furthermore, since a complex is formed in the electrolyte solution when zinc is dissolved at the time of discharging, it is possible to suppress the local dissolution of zinc. It thought that the reason why the local dissolution and precipitation are suppressed is because zinc in the case where an additive reagent is added and zinc in the case where an additive reagent is not added differ in reaction rate at the time of dissolution or precipitation since zinc forms a complex in the case where an additive reagent is added. With this effect, it is presumed that a dissolution or precipitation reaction is allowed to occur evenly on the electrode, the shape change is also suppressed, and the cycle life is enhanced.

In contrast, even when the above-mentioned additive reagent is contained in the alkaline electrolyte solution, in the cases where the content is less than 7% by volume (Comparative Examples 1-2 to 1-4), an effect of enhancing the cycle life is not recognized. In the cases where a compound having no primary amino group is contained (Comparative Examples 1-8, 1-10 and 1-11), and in the case where a compound having a primary amino group and having a carboxyl group is contained (Comparative Example 1-9), there is no effect of enhancing the cycle life.

From Table 1, in the cases (Examples 1-1 to 1-10) where ethylenediamine, propanediamine or butanediamine, which is a compound allowing the amino group to be composed only of the primary amino group and having two or more primary amino groups, in an amount of 10 to 30% by volume is contained in the alkaline electrolyte solution as a compound having a primary amino group and having no carboxyl group, the effect of enhancing the cycle life is remarkable.

Example 2

Examples 2-1 to 2-3

By using an alkaline electrolyte solution with the composition of each of Examples 1-2, 1-8 and 1-9, for the high rate discharge test, open type cells in accordance with Examples 2-1, 2-2 and 2-3 were prepared in the same manner as above, respectively.

Comparative Examples 2-1 to 2-3

By using an alkaline electrolyte solution with the composition of each of Comparative Examples 1-1, 1-8 and 1-10, for the high rate discharge test, open type cells in accordance with Comparative Examples 2-1, 2-2 and 2-3 were prepared in the same manner as above, respectively.

<High Rate Discharge Characteristics Evaluation>

With regard to alkaline storage batteries including alkaline electrolyte solutions prepared in Examples 2-1 to 2-3 and Comparative Examples 2-1 to 2-3, a high rate discharge test was performed under the following condition and under an environment of 25° C.

At the first cycle, the current was set to 0.25 CmA (25 mA), an alkaline storage battery was charged for 1 hour, and after an interval of 5 minutes, the battery was discharged so that the voltage becomes −0.8 V relative to a reference electrode.

At the following cycles, the charge current was set to 0.50 CmA (50 mA), and the alkaline storage battery was charged for 1 hour. And after an interval of 5 minutes, at the respective cycles, the battery was discharged. In all cycles, the cut-off potential at the time of discharging was set to −0.8 V relative to a reference electrode.

At the 2nd cycle to the 4th cycle, the current was set 0.5 CmA (50 mA) and the battery was discharged.

At the 5th cycle, the current was set to 0.2 CmA (20 mA) and the battery was discharged.

At the 6th cycle, the current was set to 1.0 CmA (100 mA) and the battery was discharged. After an interval of 5 minutes, furthermore, the current was set to 0.2 CmA (20 mA) and the battery was discharged. (In this context, the capacity calculated when the battery is discharged at 0.2 CmA is not added to the discharge capacity. Hereinafter, the capacity calculated when a battery is once discharged and then, without charging, the battery is discharged at 0.2 CmA is not added to the discharge capacity.)

At the 7th cycle, the current was set to 3.0 CmA (300 mA) and the battery was discharged. After an interval of 5 minutes, furthermore, the current was set to 0.2 CmA (20 mA) and the battery was discharged.

At the 8th cycle, the current was set to 0.5 CmA (50 mA) and the battery was discharged, and it was confirmed that there was no change in capacity as compared with those in the 2nd cycle to the 4th cycle.

At the 9th cycle, the current was set to 5.0 CmA (500 mA) and the battery was discharged. Furthermore, the current was set to 0.2 CmA (20 mA) and the battery was discharged.

At the 10th cycle, the current was set to 7.5 CmA (750 mA) and the battery was discharged. Furthermore, the current was set to 0.2 CmA (20 mA) and the battery was discharged.

At the 11th cycle, the current was set to 0.2 CmA (20 mA) and the battery was discharged, and it was confirmed that there was no change in capacity as compared with those in the 2nd cycle to the 4th cycle.

The results of the high rate discharge test are shown in Table 2 with the composition of the alkaline electrolyte solution and the volume % of the additive reagent (the compound having a primary amino group and having no carboxyl group, and the like).

TABLE 2

|  | Electrolyte solution | Discharge capacity/Charge capacity (%) | | | | | Volume % of additive reagent |
|---|---|---|---|---|---|---|---|
|  |  | 0.2 C | 1.0 C | 3.0 C | 5.0 C | 7.5 C |  |
| Comparative Example 2-1 | 4M KOH | 99.9 | 98.2 | 86.7 | 66.1 | 53.2 | 0 |

TABLE 2-continued

| Electrolyte solution | | Discharge capacity/Charge capacity (%) | | | | | Volume % of additive reagent |
|---|---|---|---|---|---|---|---|
| | | 0.2 C | 1.0 C | 3.0 C | 5.0 C | 7.5 C | |
| Comparative Example 2-2 | 4M KOH + 3M Glycine | 79.3 | 68.1 | 34.1 | 25.4 | 19.2 | 19.4 |
| Comparative Example 2-3 | 4M KOH + 0.5M Ethylenediamine tetraacetic acid | 99.5 | 97.6 | 78.5 | 64.7 | 56.0 | 17.0 |
| Example 2-1 | 4M KOH + 3M EDA | 99.6 | 97.9 | 91.6 | 78.9 | 68.3 | 20.0 |
| Example 2-2 | 4M KOH + 1M Propanediamine | 99.6 | 99.1 | 92.8 | 77.3 | 66.2 | 8.3 |
| Example 2-3 | 4M KOH + 2M Propanediamine | 99.9 | 98.6 | 91.3 | 79.8 | 65.6 | 16.7 |

As shown in Table 2, there is an unexpected effect that the alkaline storage batteries including alkaline electrolyte solutions of Examples 2-1 to 2-3 in which the compound having a primary amino group and having no carboxyl group is contained in an amount of 7 to 30% by volume are excellent in high rate discharge characteristics as compared with those in the case where an additive reagent is not contained (Comparative Example 2-1), in the case where a compound having no primary amino group is contained (Comparative Example 2-3), and in the case where a compound having a primary amino group and having a carboxyl group is contained (Comparative Example 2-2). It is assumed that by using the compound of the present invention, the electrode at the time of zinc dissolution is suppressed from being passivated and the deep discharge can be performed.

By using the alkaline electrolyte solution of the present invention, since the cycle life and high rate discharge characteristics of the alkaline storage battery including the alkaline electrolyte solution and a negative electrode containing zinc or the like as an active material are remarkably enhanced, this alkaline storage battery is useful as a power source for electronic equipment, an electric vehicle, or the like.

What is claimed is:

1. An alkaline storage battery comprising:
a positive electrode;
a negative electrode containing, as an active material, at least one of a metal capable of forming dendrites and a metal compound thereof; and
an alkaline electrolyte solution being an aqueous alkali solution,
wherein a compound having a primary amino group and having no carboxyl group is contained in the alkaline electrolyte solution in an amount greater than or equal to 7% by volume relative to a whole volume of the alkaline electrolyte solution, and
the compound included in the alkaline electrolyte solution includes at least one selected from the group consisting of ethylenediamine, propanediamine and butanediamine.

2. The alkaline storage battery according to claim 1, wherein the compound is contained in an amount of 13 to 30% by volume relative to the whole volume of the alkaline electrolyte solution.

3. The alkaline storage battery according to claim 1, wherein the alkaline storage battery is an open type battery.

4. The alkaline storage battery according to claim 1, wherein the compound has a molecular weight less than or equal to 200.

5. The alkaline storage battery according to claim 4, wherein the compound has a molecular weight less than or equal to 90.

6. The alkaline storage battery according to claim 1, wherein the compound is contained at a concentration greater than or equal to 2% by mole in the alkaline electrolyte solution.

7. The alkaline storage battery according to claim 1, wherein the alkaline electrolyte solution contains sodium hydroxide.

8. The alkaline storage battery according to claim 1, wherein the metal capable of forming dendrites which is the active material of the negative electrode is at least one selected from the group consisting of Zn, Mg, Cd, Al, Ca and Fe.

9. The alkaline storage battery according to claim 8, wherein the metal capable of forming dendrites is Zn.

10. The alkaline storage battery according to claim 1, wherein the positive electrode is an air electrode.

* * * * *